United States Patent
Stander

(10) Patent No.: US 9,878,590 B2
(45) Date of Patent: Jan. 30, 2018

(54) HEATER-CORE COVER WITH HEAT PICKUP FOR ASPIRATOR AIR NOZZLE

(71) Applicants: DENSO International America, Inc., Southfield, MI (US); DENSO CORPORATION, Kariya-shi, Aichi-ken (JP)

(72) Inventor: James Stander, West Bloomfield, MI (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 431 days.

(21) Appl. No.: 14/629,576

(22) Filed: Feb. 24, 2015

(65) Prior Publication Data

US 2015/0239323 A1    Aug. 27, 2015

Related U.S. Application Data

(60) Provisional application No. 61/944,292, filed on Feb. 25, 2014.

(51) Int. Cl.
| | |
|---|---|
| *B60H 1/02* | (2006.01) |
| *B60H 1/22* | (2006.01) |
| *B60H 1/00* | (2006.01) |

(52) U.S. Cl.
CPC ... *B60H 1/00064* (2013.01); *B60H 2001/002* (2013.01); *B60H 2001/00092* (2013.01)

(58) Field of Classification Search
CPC ............ B60H 1/00064; B60H 1/00514; B60H 2001/00092; B60H 2001/002
See application file for complete search history.

(56) References Cited

U.S. PATENT DOCUMENTS

| | | | | |
|---|---|---|---|---|
| 3,260,298 A | * | 7/1966 | Spooner | B60H 1/2212 126/110 R |
| 3,501,257 A | * | 3/1970 | Hebert | B60H 1/2209 122/14.22 |
| 2004/0016537 A1 | * | 1/2004 | Nakamura | B60H 1/00792 165/204 |
| 2009/0191804 A1 | * | 7/2009 | Goenka | B60H 1/005 454/75 |
| 2011/0005718 A1 | * | 1/2011 | Seto | B60H 1/00064 165/61 |
| 2015/0165866 A1 | * | 6/2015 | Kim | B60H 1/00807 165/11.1 |

* cited by examiner

*Primary Examiner* — Steven B McAllister
*Assistant Examiner* — Jonathan Cotov
(74) *Attorney, Agent, or Firm* — Harness, Dickey & Pierce, P.L.C.

(57) ABSTRACT

An HVAC assembly for conditioning air within a vehicle passenger cabin. The assembly includes a housing, at least one front air inlet and at least one front air outlet for conditioning air at a front of the cabin, at least one rear air inlet and at least one rear air outlet for conditioning air at a rear of the cabin, and a heater core. A cover is configured to: be mounted to an exterior of the housing over at least one heater core conduit; direct airflow exiting the housing to the at least one heater core conduit to permit heat transfer from heated coolant flowing through the at least one heater core conduit to the airflow to heat the airflow; and direct the heated airflow out from within the cover towards the at least one rear air inlet to mix with air exiting the at least one rear air inlet.

20 Claims, 3 Drawing Sheets

HEATER-CORE COVER WITH HEAT PICKUP FOR ASPIRATOR AIR NOZZLE

CROSS-REFERENCE TO RELATED APPLICATION

This application claims the benefit of U.S. Provisional Application No. 61/944,292 filed on Feb. 25, 2014, the entire disclosure of which is incorporated herein by reference.

FIELD

The present disclosure relates to a heater-core cover with heat pickup for an aspirator air nozzle.

BACKGROUND

This section provides background information related to the present disclosure, which is not necessarily prior art.

Integrated heating, ventilation, and air cooling (HVAC) assemblies are used in vehicles to condition air in both a front portion and a rear portion of a passenger cabin of the vehicle. Integrated HVAC assemblies use a single evaporator to cool, and a single heater core to heat, both the front and the rear portions of the vehicle. While integrated HVAC assemblies are suitable for their intended use, they are subject to improvement.

For example, integrated HVAC assemblies are intended to operate such that air enters a housing thereof through a front inlet and a rear inlet of the housing. Air entering the housing through the front inlet can originate from the front portion of the passenger cabin or from outside the passenger cabin. Air entering the housing through the rear inlet can originate from the rear portion of the passenger cabin. Air that enters the housing is typically conditioned by the evaporator or the heater, and then flows out of the housing through front outlets to the front portion of the passenger cabin, and/or through rear outlets to the rear portion of the passenger cabin.

Some integrated HVAC assemblies experience an issue in which air entering the housing through the front inlet undesirably "leaks" across the evaporator if the evaporator is less than perfectly sealed, and exits the housing through the rear inlet (see airflow A illustrated in FIG. 1 and described further herein) without being heated by the heater core. This air may be cold if it comes from outside of the vehicle, particularly in the winter. This cold air can often be felt at passengers' feet, making them uncomfortable. It would therefore be desirable to prevent this cold air from reaching passengers. The present teachings address this issue, as well as numerous others.

SUMMARY

This section provides a general summary of the disclosure, and is not a comprehensive disclosure of its full scope or all of its features.

The present teachings provide for a heating, ventilation, and air-cooling (HVAC) assembly configured to condition air within a vehicle passenger cabin. The assembly includes a housing, at least one front air inlet and at least one front air outlet for conditioning air at a front portion of the cabin, at least one rear air inlet and at least one rear air outlet for conditioning air at a rear portion of the vehicle passenger cabin, and a heater core within the housing. A cover is configured to: be mounted to an exterior of the housing over at least one heater core conduit; direct airflow exiting the housing to the at least one heater core conduit to permit heat transfer from heated coolant flowing through the at least one heater core conduit to the airflow to heat the airflow; and direct the heated airflow out from within the cover towards the at least one rear air inlet to mix with air exiting the at least one rear air inlet.

The present teachings provide for an additional HVAC assembly configured to condition air within a vehicle passenger cabin. The HVAC assembly includes a housing, at least one front air inlet and at least one front air outlet, at least one rear air inlet and at least one rear air outlet, a heater core within the housing, an evaporator within the housing, and an aspirator assembly including an aspirator nozzle at an exterior of the housing. The aspirator assembly is configured to direct airflow heated by the heater core out from within the housing. A cover is mounted to an exterior of the housing over at least one heater core conduit. The cover is configured to: direct airflow from the aspirator assembly to the at least one heater core conduit to permit heat transfer from heated coolant flowing through the at least one heater core conduit to the airflow to heat the airflow; and direct the heated airflow out from within the cover towards the at least one rear air inlet to mix with air exiting the at least one rear air inlet.

The present teachings provide for another HVAC assembly. The HVAC assembly includes a housing, at least one front air inlet, at least one front air outlet, at least one rear air inlet, and at least one rear air outlet. A heater core and evaporator are included within the housing. An aspirator assembly includes an aspirator nozzle at an exterior of the housing. The aspirator assembly configured to direct airflow heated by the heater core out from within the housing. An inlet heater core conduit extends from the exterior of the housing. An outlet heater core conduit extends from the exterior of the housing. A cover is mounted to the exterior of the housing over at least a portion of each of the aspirator nozzle, the inlet heater core conduit, and the outlet heater core conduit. The cover is configured to: direct airflow from the aspirator nozzle to both the inlet and outlet heater core conduits to permit heat transfer from heated coolant flowing through the inlet and outlet heater core conduits to the airflow to heat the airflow; and direct the heated airflow out from within the cover towards the at least one rear air inlet to mix with air exiting the at least one rear air inlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
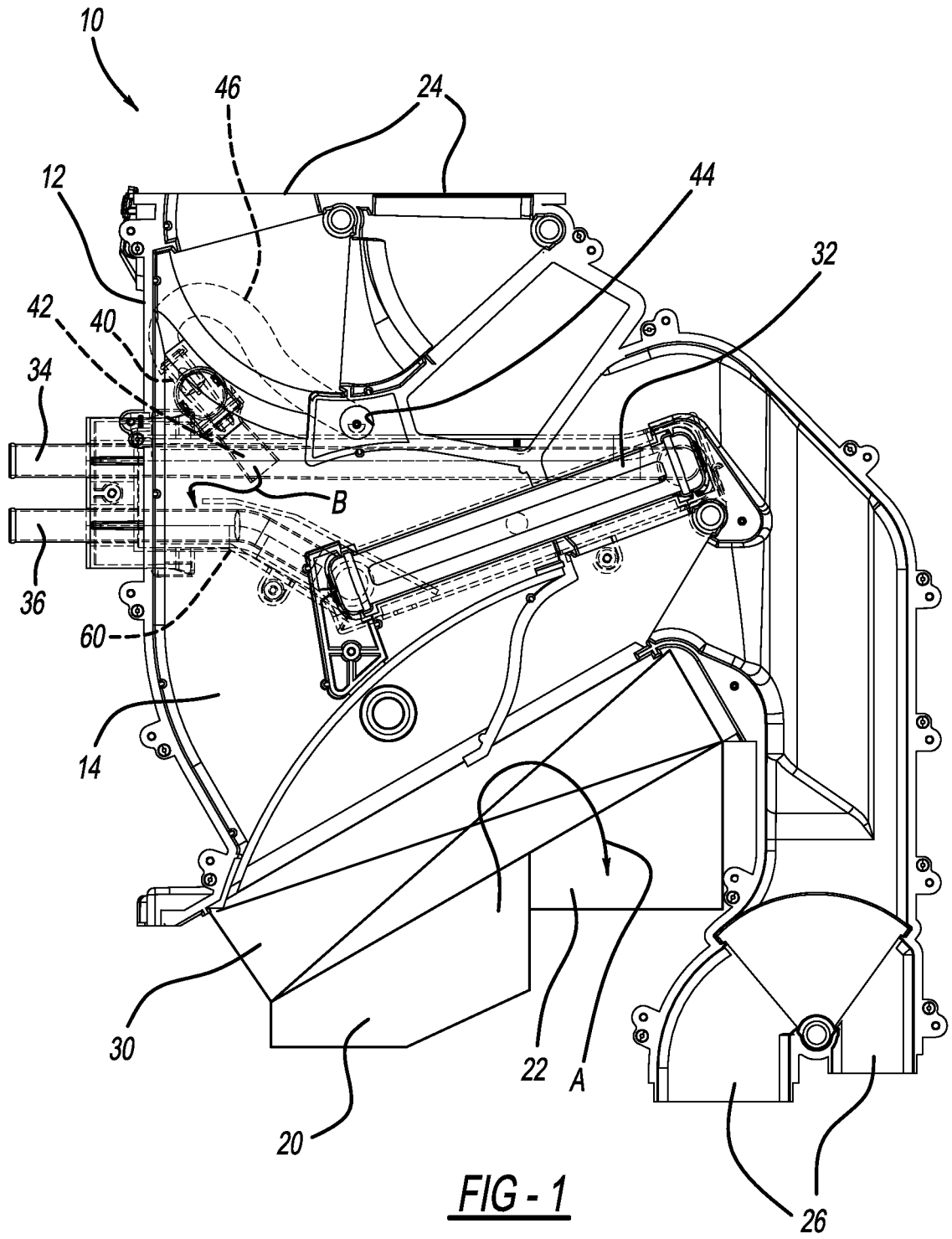
FIG. 1 is a cross-sectional view of an HVAC assembly according to the present teachings.

With initial reference to FIG. 1, a heating, ventilation, and air-cooling (HVAC) assembly is illustrated at reference numeral 10. The HVAC assembly 10 is suitable for conditioning air within a passenger cabin of any suitable vehicle, such as a passenger car, truck, sport utility vehicle (SUV), bus, van, train, military vehicle, aircraft, or any other suitable vehicle.

Figure 2:
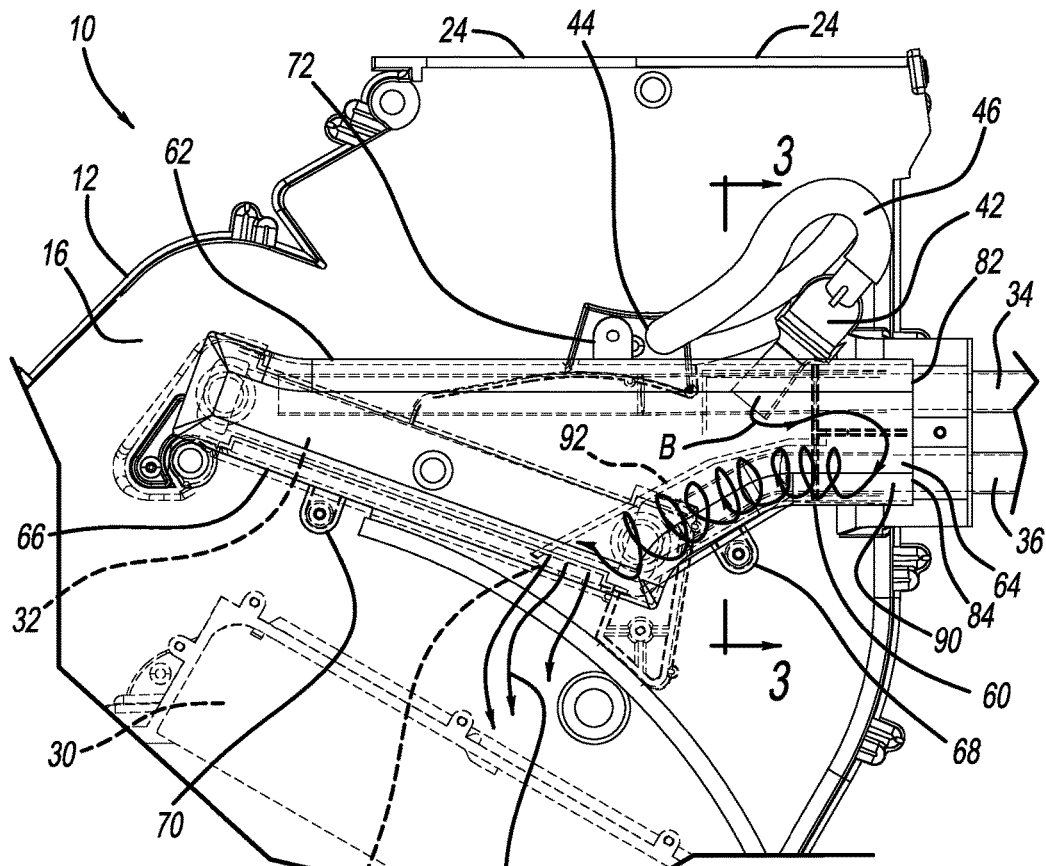
FIG. 2 is an outer view of the HVAC assembly of FIG. 1.
Figure 3:
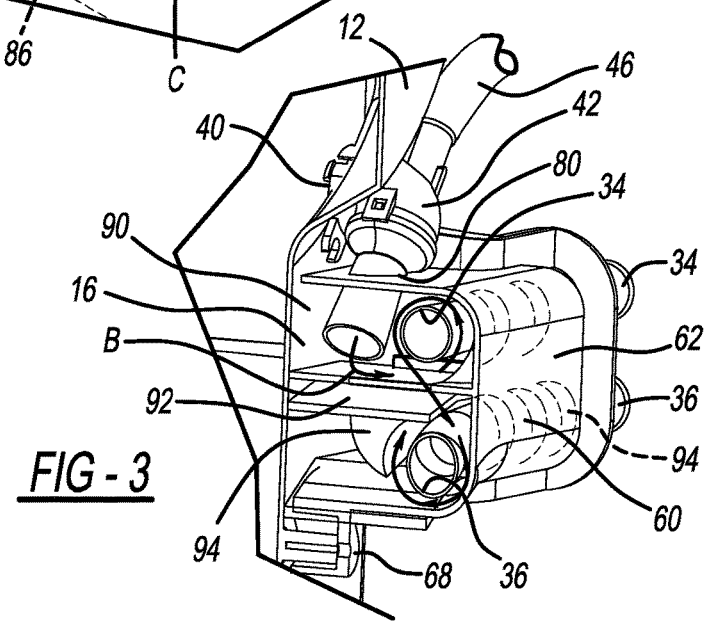
FIG. 3 is a cross-sectional view taken along line 3-3 of FIG. 2.
Figure 4:
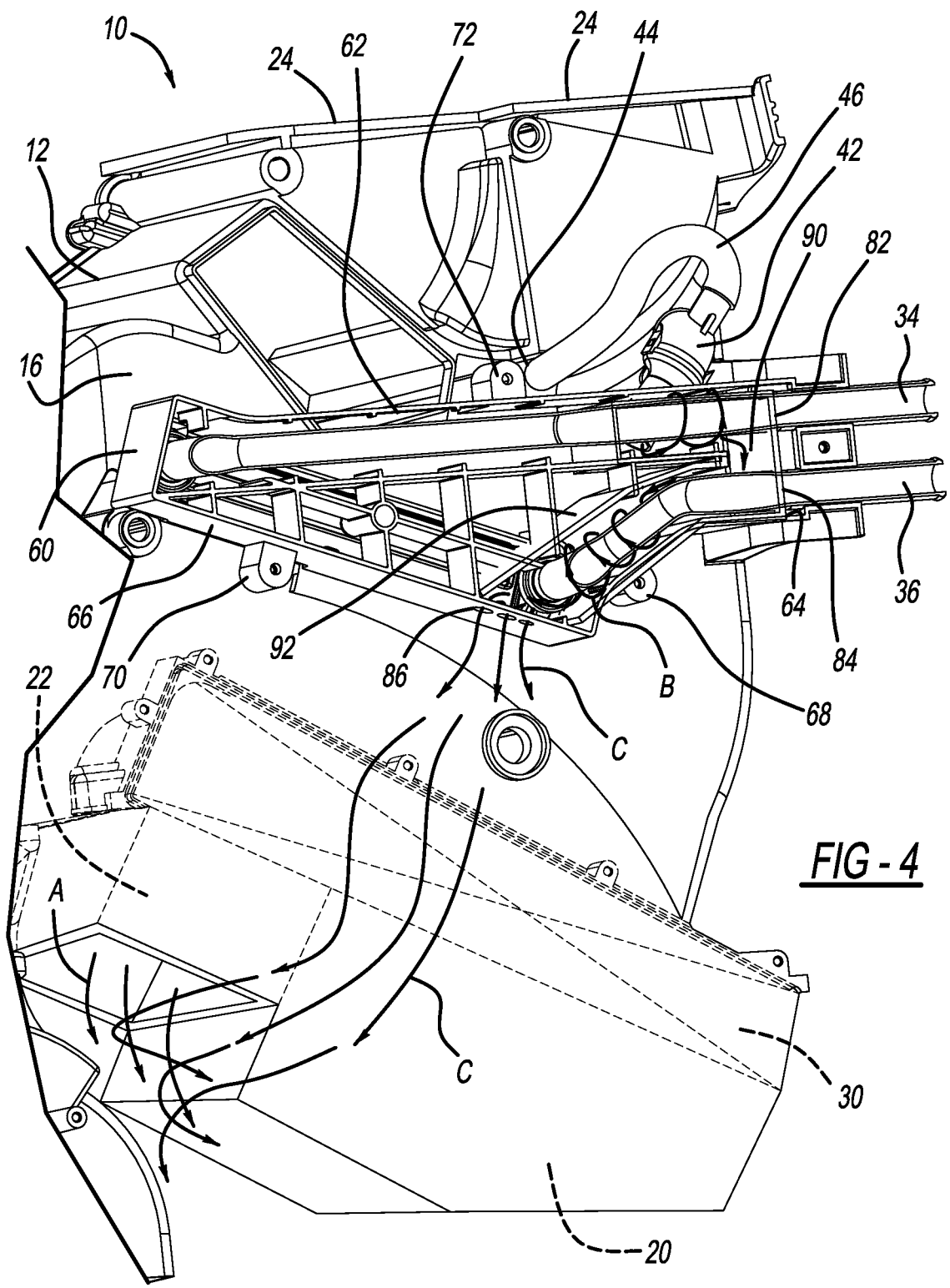
FIG. 4 is an outer view of the HVAC assembly of FIG. 1 illustrating a heater-core conduit cover in cross-section.

The HVAC assembly 10 generally includes a housing 12 having an inner surface 14 (FIG. 1, for example) and an outer surface 16 (FIGS. 2, 3, and 4, for example). As illustrated in FIG. 1, for example, the housing 12 further includes and/or defines a front inlet 20, a rear inlet 22, front outlets 24, and rear outlets 26. Within the HVAC assembly 10 is an evaporator 30 and a heater core 32. A first or inlet conduit 34 extends from the housing 12 to or towards an engine of the vehicle. A second or outlet conduit 36 extends from the housing 12 to or towards the engine, or vice versa. The first conduit 34 is configured to direct a suitable coolant from the engine to the heater core 32, and the second conduit 36 is configured to direct the coolant from the heater core 32 back to the engine. The coolant, which is heated by the engine, heats the heater core 32, which heats airflow passing therethrough. The evaporator 30, when activated, absorbs heat from air passing therethrough in order to cool the air. The heater core 32 and the evaporator 30 are conventional components, which one skilled in the art is well familiar with.

During operation of the HVAC assembly 10, air flows into the housing 12 through the front inlet 20 and/or the rear inlet 22. Air flowing into the housing 12 through the front inlet 20 may be from a front portion of a passenger cabin of the vehicle, or may be exterior air flowing into the housing 12 from outside of the vehicle. Air flowing into the housing 12 through the front inlet 20 from outside the vehicle may be quite cold, particularly during winter. Air flowing into the housing 12 through the rear inlet 22 may be from a rear area of the passenger cabin. Air flowing into the housing 12 through the front and rear inlets 20 and 22 is typically conditioned by the evaporator to cool the air, or by the heater core 32 to heat the air. The conditioned air then exits the housing 12 through the front outlets 24 and is directed to the front portion of the passenger cabin, and/or the conditioned air exits the housing 12 through the rear outlets 26 and is directed to the rear portion of the passenger cabin.

In some situations, cold airflow from outside of the vehicle entering the housing 12 through the front inlet 20 may exit the housing 12 through the rear inlet 22 prior to being heated by the heater core 32, as illustrated at airflow A in FIG. 1. This cold, unconditioned airflow A may flow out from the housing 12 to the feet of passengers within the passenger cabin, undesirably causing the passengers to experience cold air at their feet.

Most airflow heated by the heater core 32 will exit the housing 12 through the front outlets 24 and/or the rear outlets 26. Some airflow heated by the heater core 32 will exit the housing 12 through an aperture 40 defined by the housing 12. The aperture 40 can be at any suitable position, and is illustrated as being generally between the heater core 32 and the front outlets 24, or at any other suitable position. From the aperture 40, the airflow passes to an aspirator nozzle 42 mounted on the outer surface 16 of the housing 12. The airflow then flows out from within the aspirator nozzle 42, as illustrated in FIGS. 1-4 at letter "B." Conventionally, the airflow B is "wasted" as aspirator air in that it is dumped into and under the dashboard, thus not increasing the overall comfort of the occupants of the vehicle. The present teachings advantageously do not "waste" the airflow B, but rather make use of it as described below in order to improve passenger comfort.

The housing 12 can define an additional aperture 44, which can also be located between the heater core 32 and the front outlets 24, or at any other suitable position. Extending between the aperture 44 and the aspirator nozzle 42 can be any suitable tunnel or tube 46, which can draw air out from within the housing 12 to any suitable temperature sensor for measuring temperature of air flowing out of the housing 12 through the additional aperture 44. Air passing through the tunnel or tube 46 mixes with airflow passing through the aperture 40 at the aspirator nozzle 42 and exits the aspirator nozzle 42 as airflow B.

From the aspirator nozzle 42 the airflow B flows into a cover 60 mounted to the outer surface 16 of the housing 12, as illustrated in FIGS. 1-4. With particular reference to FIGS. 2 and 4, for example, the cover 60 generally includes a main body portion 62, a first end 64, and a second end 66, which is generally opposite to the aspirator nozzle 42. The cover 60 can be secured to the outer surface 16 of the housing 12 in any suitable manner. For example, the cover 60 can include a first coupling portion 68, a second coupling portion 70, and a third coupling portion 72. The first, second, and third coupling portions 68, 70, and 72 can be any suitable coupling device, structure, or configuration suitable to secure the cover 60 to the outer surface 16 of the housing 12 in the location illustrated. The cover 60 can also be secured to the outer surface 16 with a tongue and groove locking configuration, a butt joint, or any other suitable locking configuration. The cover 60 is secured to the outer surface 16 of the housing 12 such that the cover 60 covers at least a portion of the aspirator nozzle 42, the first conduit 34, and the second conduit 36. The cover 60 may also be sized and shaped to cover some or all of the tube 46. The cover 60 is sized and shaped complementary to the outer surface 16 to closely mate with the outer surface 16, thereby restricting air from leaking out from within the cover 60 where the cover contacts the outer surface 16.

To accommodate the aspirator nozzle 42, the cover 60 can define, or at least partially define, an aperture or opening 80, as illustrated in FIG. 3 for example. To accommodate the first conduit 34, the cover 60 can define, or at least partially define, a first conduit aperture 82 configured to receive the first conduit 34 therethrough (as illustrated in FIGS. 2 and 4, for example). To accommodate the second conduit 36, the cover 60 can define, or at least partially define, a second conduit aperture 84 configured to receive the second conduit 36 therethrough. The first and second conduit apertures 82 and 84 are generally at the first end 64 of the cover 60. At the second end 66, the cover 60 defines one or more outlet nozzles or outlet apertures 86 from which airflow exits the cover 60. As further described herein, the outlet nozzles or outlet apertures 86 are arranged to direct airflow exiting the cover 60 (illustrated in FIGS. 2, 3, and 4 at letter "C") towards the rear inlet 22 in order to mix with and warm the cold, unconditioned airflow A (as illustrated in FIG. 4) so that cold airflow A does not make occupants uncomfortable. The outlet nozzles or outlet apertures 86 may be configured to "shoot" airflow out from within the cover 60 at about 13.5 m$^3$/hr.

The cover 60 at least partially defines a subchamber 90 (see FIGS. 2-4), which generally extends from the aspirator aperture or opening 80 to the outlet apertures 86. An inner wall 92 of the cover 60 extends from about the aspirator aperture or opening 80 to the outlet apertures 86 in order to direct the airflow B through the subchamber 90 from the aspirator nozzle 42 and out through the outlet apertures 86. The subchamber 90 can be defined by the inner wall 92, portions of the cover 60, and portions of the outer surface 16 of the housing 12 opposite to the cover 60. The first conduit 34 extends through a portion of the subchamber 90 proximate to the aspirator nozzle 42, and the second conduit 36 extends through the subchamber 90 from the first end 64 to the nozzles or outlet apertures 86.

With reference to FIG. 3 for example, the cover 60 can include one or more helical channels 94 within the subchamber 90 configured to cause the airflow B to flow in a circular manner over at least one of the first conduit 34 and the second conduit 36. The helical channels 94 can be formed or defined in any suitable manner. For example, the helical channels 94 can be defined by the main body portion 62 at the subchamber 90 and/or the inner wall 92, as generally illustrated in FIG. 3.

During operation of the HVAC assembly 10, warm airflow B flowing out from within the aspirator nozzle 42, which has been warmed by the heater core 32, is directed through the cover 60, and specifically through the subchamber 90. As the airflow B passes over portions of the first and second conduits 34 and 36 extending through the subchamber 90, heat from the warm engine coolant passing through the first and second conduits 34 and 36 is transferred to the airflow B, thereby further warming the airflow B. This heat transfer can be facilitated by the helical channels 94, which circulate the airflow B about the first and second conduits 34 and 36. The warmed airflow B exits the cover 60 through the outlet apertures 86 as heated airflow (C) (see FIGS. 2 and 4). The outlet apertures 86 direct the heated airflow C to the rear inlet 22 where the heated airflow C mixes with the cool, unconditioned airflow A to raise the temperature of the airflow A and prevent the passengers from undesirably feeling the cold airflow A (see FIG. 4). For example, airflow B exiting the aspirator nozzle 42 can be at about 75° F. after being warmed by the heater core 32. As the airflow B passes over the first and second conduits 34 and 36, which can have coolant passing therethrough at about 88° F., the airflow B can be heated to about 80° F. The heated airflow C exiting the outlet apertures 86 is thus at about 80° F. and flowing at about 13.5 m³/hr.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings are provided for purposes of illustration and description. They are not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation, and air-cooling (HVAC) assembly configured to condition air within a vehicle passenger cabin, the HVAC assembly comprising:
   a housing;

at least one front air inlet and at least one front air outlet for conditioning air at a front portion of the vehicle passenger cabin;

at least one rear air inlet and at least one rear air outlet for conditioning air at a rear portion of the vehicle passenger cabin;

a heater core within the housing; and a cover configured to: be mounted to an exterior of the housing over at least one heater core conduit; direct airflow exiting the housing through a housing aperture defined by the housing to the at least one heater core conduit to permit heat transfer from heated coolant flowing through the at least one heater core conduit to the airflow to heat the airflow; and direct the heated airflow out from within the cover towards the at least one rear air inlet to mix with air exiting the at least one rear air inlet.

2. The HVAC assembly of claim 1, wherein the at least one heater core conduit includes an inlet heater core conduit configured to direct the coolant from an engine to the heater core, and an outlet heater core conduit configured to direct the coolant from the heater core towards the engine.

3. The HVAC assembly of claim 1, wherein the housing further comprises an evaporator.

4. The HVAC assembly of claim 1, further comprising an aspirator configured to direct the airflow out from within the housing through the housing aperture to within the cover.

5. The HVAC assembly of claim 1, wherein the cover at least partially defines a subchamber configured to direct the airflow to the at least one heater core conduit and out from within the cover through at least one outlet aperture defined by the cover.

6. The HVAC assembly of claim 1, wherein the cover defines channels that are at least partially helical, the channels configured to circle the airflow about the at least one heater core conduit to heat the airflow by facilitating heat transfer from the heated coolant flowing through the at least one heater core conduit to the airflow.

7. The HVAC assembly of claim 1, wherein the at least one heater core conduit includes an inlet conduit and an outlet conduit; and wherein the cover at least partially defines an aspirator aperture configured to receive an aspirator nozzle therein, a first conduit aperture configured to receive the inlet conduit therethrough, a second conduit aperture configured to receive the outlet conduit therethrough, and at least one outlet aperture configured to direct the airflow from the cover to the at least one rear air inlet.

8. A heating, ventilation, and air-cooling (HVAC) assembly configured to condition air within a vehicle passenger cabin, the HVAC assembly comprising:

a housing;

at least one front air inlet and at least one front air outlet for conditioning air at a front portion of the vehicle passenger cabin;

at least one rear air inlet and at least one rear air outlet for conditioning air at a rear portion of the vehicle passenger cabin;

a heater core within the housing;

an evaporator within the housing;

an aspirator assembly including an aspirator nozzle at an exterior of the housing, the aspirator assembly configured to receive and direct airflow exiting the housing through a first housing aperture defined by the housing, the airflow heated by the heater core; and a cover mounted to an exterior of the housing over at least one heater core conduit, the cover configured to: direct airflow from the aspirator assembly to the at least one heater core conduit to permit heat transfer from heated coolant flowing through the at least one heater core conduit to the airflow to heat the airflow; and direct the heated airflow out from within the cover towards the at least one rear air inlet to mix with air exiting the at least one rear air inlet.

9. The HVAC assembly of claim 8, wherein the aspirator assembly further includes a conduit extending from a second housing aperture defined by the housing to the aspirator nozzle at an exterior of the housing.

10. The HVAC assembly of claim 8, wherein the cover at least partially defines a subchamber configured to direct the airflow from the aspirator nozzle to the at least one heater core conduit.

11. The HVAC assembly of claim 10, wherein the cover includes a plurality of outlet apertures facing the at least one rear air inlet and configured to direct the airflow from the subchamber to the at least one rear air inlet.

12. The HVAC assembly of claim 11, wherein the subchamber defines channels that are at least partially helical, the channels configured to circle the airflow about the at least one heater core conduit to heat the airflow by facilitating heat transfer from the heated coolant flowing through the at least one heater core conduit to the airflow.

13. The HVAC assembly of claim 12, wherein the subchamber is partially defined by the exterior of the housing.

14. The HVAC assembly of claim 8, wherein the at least one heater core conduit includes an inlet conduit and an outlet conduit; and wherein the cover at least partially defines: an aspirator aperture configured to receive the aspirator nozzle therein; a first conduit aperture configured to receive the inlet conduit therethrough; a second conduit aperture configured to receive the outlet conduit therethrough; and a plurality of outlet apertures configured to direct the airflow from the cover to the at least one rear air inlet.

15. A heating, ventilation, and air-cooling (HVAC) assembly configured to condition air within a vehicle passenger cabin, the HVAC assembly comprising:

a housing;

at least one front air inlet and at least one front air outlet for conditioning air at a front portion of the vehicle passenger cabin;

at least one rear air inlet and at least one rear air outlet for conditioning air at a rear portion of the vehicle passenger cabin;

a heater core within the housing;

an evaporator within the housing;

an aspirator assembly including an aspirator nozzle at an exterior of the housing, the aspirator assembly configured to receive and direct airflow exiting the housing through a housing aperture defined by the housing, the airflow heated by the heater core;

an inlet heater core conduit extending from the exterior of the housing;

an outlet heater core conduit extending from the exterior of the housing; and a cover mounted to the exterior of the housing over at least a portion of each of the aspirator nozzle, the inlet heater core conduit, and the outlet heater core conduit;

wherein the cover is configured to: direct airflow from the aspirator nozzle to both the inlet and outlet heater core conduits to permit heat transfer from heated coolant flowing through the inlet and outlet heater core conduits to the airflow to heat the airflow; and direct the heated airflow out from within the cover towards the at least one rear air inlet to mix with air exiting the at least one rear air inlet.

16. The HVAC assembly of claim 15, wherein the cover at least partially defines an aspirator aperture through which the aspirator nozzle extends, a first conduit aperture through which the inlet heater core conduit extends, and a second conduit aperture through which the outlet heater core conduit extends.

17. The HVAC assembly of claim 16, wherein the cover further defines a plurality of outlet apertures configured to direct the airflow out from within the cover towards the at least one rear air inlet.

18. The HVAC assembly of claim 15, wherein the cover at least partially defines a subchamber configured to direct the airflow from the aspirator nozzle to a plurality of outlet apertures defined by the cover, the outlet apertures configured to direct the airflow towards the at least one rear air inlet.

19. The HVAC assembly of claim 18, wherein the subchamber defines channels that are at least partially helical, the channels configured to circle the airflow about the inlet and the outlet heater core conduits to heat the airflow by facilitating heat transfer from the heated coolant flowing through the inlet and the out heater core conduits to the airflow.

20. The HVAC assembly of claim 19, wherein the subchamber is at least partially defined by the exterior of the housing.

* * * * *